UNITED STATES PATENT OFFICE.

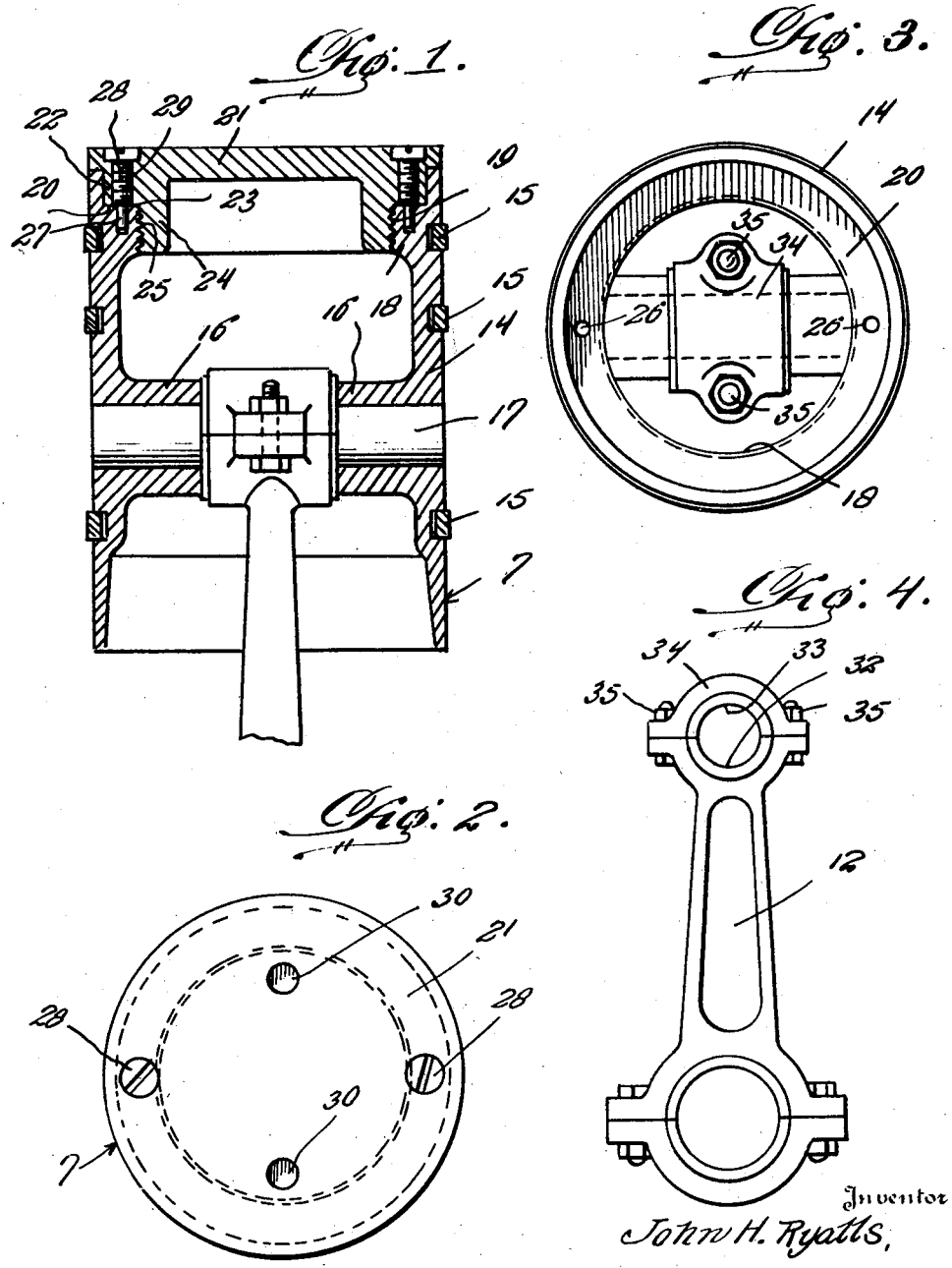

JOHN H. RYALLS, OF CHARLOTTESVILLE, VIRGINIA, ASSIGNOR OF ONE-THIRD TO L. G. HOXTON AND ONE-THIRD TO CHAS. H. PAGE, BOTH OF CHARLOTTESVILLE, VIRGINIA.

PISTON CONSTRUCTION.

Application filed August 26, 1924. Serial No. 734,323.

*To all whom it may concern:*

Be it known that I, JOHN H. RYALLS, a citizen of the United States, residing at Charlottesville, in the county of Albemarle and State of Virginia, have invented certain new and useful Improvements in Piston Constructions, of which the following is a specification.

This invention relates to improvements in the construction of pistons for internal combustion engines.

An object of the invention resides in providing a piston construction for internal combustion engines having removable cylinder heads, which are constructed to adapt the removal of the piston from the cylinder and the disconnection of the piston pin bearing from the upper end of the cylinder block by merely removing the cylinder head.

Another object of the invention resides in providing a piston construction, wherein the skirt portion of the piston and the ring carrying portion are formed integral and provided at the upper end with an annular shouldered recess with which communicates a portion of small diameter, which is screw threaded for the reception of a threaded flange projecting from a shoulder portion on the piston cap, which is adapted to seat in the shouldered end of the skirt portion of the piston, and which is provided with set screws threadedly mounted in the cap portion of the piston and having reduced extensions for engaging in suitable openings formed in the shouldered portion of said piston, said screws adapted to prevent said cap portion from rotating in the head of the piston and becoming disengaged therefrom, while the same is in operation in the cylinder, said cap forming the piston head and the active surfaces on which the gases of combustion act to guide the piston in the cylinder, and which, upon removal from the skirt portion permits the removal of the upper section with a sectional bearing used in connection with the wrist pin in the skirt portion of the piston, so that said skirt portion may be removed from the cylinder by merely removing the cylinder head and the cap of the piston.

The invention further includes other objects and improvements in the construction and assemblage of the parts as well as the specific formation thereof, which are more particularly pointed out in the following description and claim, directed to a preferred form of the invention, it being understood, however, that variations may be made in this specific construction and arrangement of parts without departing from the spirit and scope of the invention as described and claimed.

In the drawing, forming a part of this application:

Figure 1 is an enlarged sectional view of the piston constructed according to this invention.

Figure 2 is a plan view of the piston.

Figure 3 is a plan view of the skirt portion of the piston showing the cap portion removed therefrom.

Figure 4 is a detail view of the improved connecting rod used with the improved piston construction.

The piston is indicated generally at 7 and as constructed according to this invention is connected to the usual connecting rod 12, which is connected to suitable bearings on the crank shaft 13 which are mounted for reciprocating action in the cylinder of the engine in a well known manner. The piston 7 has a skirt portion 14, which is formed to receive a plurality of piston rings 15, in the piston ring grooves formed therein in the usual manner, and which is provided in the central portion with inwardly directed cylindrical portions 16, which receive and mount the usual wrist pins 17 therein, against rotation. The upper end of the sleeve is formed with an inwardly directed annular flange 18, which is screw threaded as at 19, on the inner surface thereof, and which is formed at 20 with an annular shoulder and a portion of enlarged diameter extending through the upper end of the piston. The piston cap or head 21 is of annular form and has a diameter equal to the diameter of the skirt portion 14, and is provided with an extension of reduced diameter from the upper end thereof, which is indicated at 22, and formed with a shoulder at 23, adapted to seat against the shoulder 20. A cylindrical projection of substantially small diameter indicated at 24, is arranged in concentric relation with the remaining portions of the piston head, and screw threaded on the outer surface thereof as indicated at 25, for threaded cooperation with the thread 18 of the internally flanged portion of the skirt 14 of the piston. The annular internal flanged portion 18 of the piston skirt 14 is provided at diametrically opposite points with openings 26, extending through the shoulder portion 20 and the axes of which are arranged in parallel relation with the axis of the skirt portion 14 of the piston, and which are adapted to receive the reduced extensions 27, on screw members 28, which are screw threaded into suitable openings 29 extending through the piston head 21 and the shoulder portion 23 thereof, in order that these screws may be inserted into the piston head with the extension 27 seated in the opening 26 in the skirt portion of the piston, for preventing the piston head from rotating therein, when secured in place. This assemblage of the parts is clearly shown in Figure 1, and it will be readily appreciated that after the engine, in which this piston is mounted has been run for a short length of time, that the carbon forming on the upper surface of the piston head will form over the screws and in the slot therein, and effectively lock the same against movement in the piston head or cap portion, so that thereafter the cap portion is held in place and against rotation in the skirt portion 14, regardless of any difference of expansion due to the difference of heating of the various portions of the piston and the head and the severance of the head portion and the skirt portion thereby prevented.

The cap portion of the piston is provided at 30, with recesses therein adapted to receive a suitable wrench, for applying and removing said cap portion from the skirt portion when the piston is assembled or disassembled on the engine and in the cylinder, in order to remove the skirt portion therefrom. A special connecting rod construction is provided in connection with this piston construction, which is shown at 12, in Figure 4, and is formed at the upper end with a half bearing 32, with which cooperates a half bearing 33 carried by a suitable removable bearing member 34, which is secured to the main portion of the connecting rod by suitable bolts 35, in the usual well known manner.

With an engine constructed according to this invention, it will be readily seen that the piston may be entirely removed from the cylinder by removing the cylinder head therefrom and then removing the screws 28 and the head 21 from the skirt portion 14, which provides access to the bolts 35 securing the removable section 34 to the connecting rod, and which, upon removal, will permit the removal of the skirt portion of the cylinder, so that new piston rings or a new piston may be placed in the cylinder and any other operation desired may be applied thereto, and at the same time may be placed in the cylinder without removing the bearing connection of the connecting rod with the crank shaft or any of the associated parts which provide access to the crank shaft, and which exceedingly simplifies the construction of an internal combustion engine to permit the repair and replacement of the piston constructions and parts thereof, with a minimum time and at a minimum cost, and upon the removal of a very few parts.

From the above description, it should be readily appreciated that a relatively simple and efficient construction has been provided for internal combustion engines, wherein the cap portion is readily removable, in order to permit the piston's removal from the cylinder, without removing the connecting rod bearing from the crank shaft, and which provides a rigidly interlocked structure when the parts are secured in assembled relation.

What is claimed is:

A piston comprising a skirt portion formed with wrist pin bearings intermediate the ends, the upper end of said skirt portion being formed with an inwardly directed annular flange having the inner periphery screw threaded and formed with a shoulder on the upper end, the upper end of the skirt portion being formed with an internal diameter of enlarged size above said shoulder portion extending through the upper end of said skirt portion, a cap having an external diameter equal to that of the skirt portion, and an annular projection of reduced diameter to fit the enlarged diameter of the upper end of the skirt portion, and a reduced extension from said annular projection of reduced diameter and threaded for cooperation with the threaded portion of the flange of the skirt portion, and locking screws adapted for threaded cooperation with the cap portion, and projecting into openings in the flange of the skirt portion for locking said cap portion after threaded application on the skirt portion against movement thereon.

In testimony whereof I affix my signature.

JOHN H. RYALLS.